March 6, 1934.  E. VON RECSEY ET AL  1,950,280
METHOD OF AND DEVICE FOR TREATING STABLE MANURE
Filed July 23, 1932  2 Sheets-Sheet 1
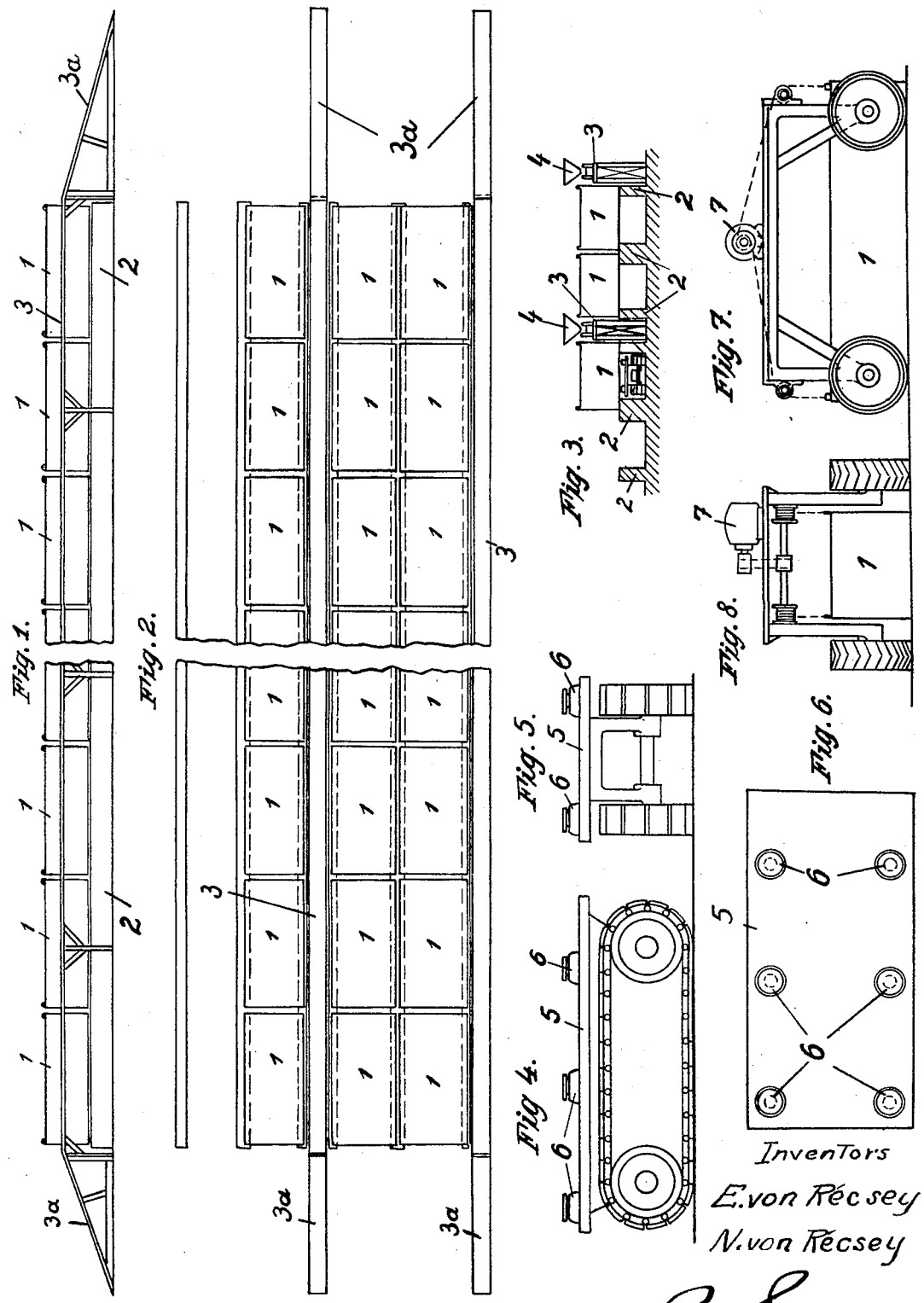

March 6, 1934. E. VON RECSEY ET AL 1,950,280
METHOD OF AND DEVICE FOR TREATING STABLE MANURE
Filed July 23, 1932 2 Sheets-Sheet 2
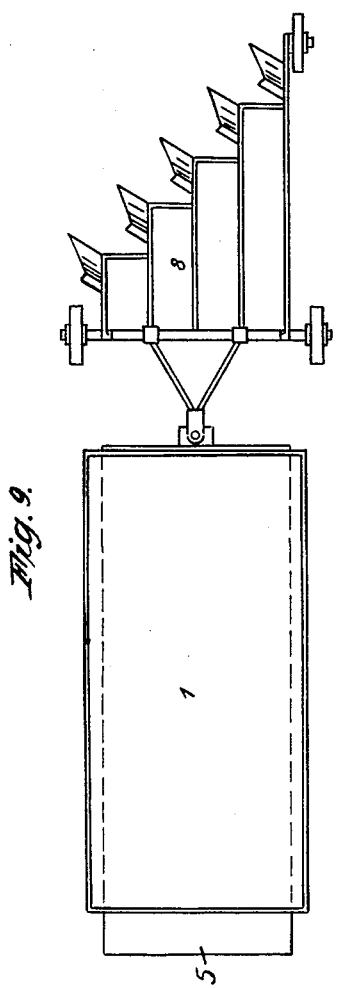
Inventors
E. von Récsey
N. von Récsey
by [signature] Atty.

Patented Mar. 6, 1934

1,950,280

UNITED STATES PATENT OFFICE 1,950,280

METHOD OF AND DEVICE FOR TREATING STABLE MANURE

Elemér von Récsey and Nicolaus von Récsey, Berlin, Germany

Application July 23, 1932, Serial No. 624,300
In Germany July 31, 1930

1 Claim. (Cl. 214—1)

We have filed applications in Germany, July 31, 1930, and Hungary, July 31, 1931.

In small agricultural establishments the stable manure is thrown upon the so-called dung-hill and is later on, when it is to be used, loaded upon carts or the like and conveyed to the field. Storing the stable manure upon the dung-hill is extraordinarily uneconomical, as the valuable components thereof get lost in consequence of this manner of storing. In larger establishments the completely antiquitated and in every respect uneconomical method of storing the stable manure in the form of dung-hills has mostly been abolished and so-called dung-beds have been provided instead thereof. These beds are formed by stationary troughs, the walls of which are lined with bricks or are cemented, and which are comparatively large and are preferably protected from rain and the sun. By storing the stable manure in such beds the result is attained that it keeps its valuable properties also if it must be stored for a comparatively long time, but as said beds are stationary the necessity arises to load the manure upon carts or the like when it is to be conveyed to the field where it is to be used. This reloading of the manure does not only require much time and is connected with much labor and trouble, but entails also a detrimental effect upon the quality of the same.

The object of the present invention is to preserve the advantages presented by the stationary troughs or beds with their masonry walls or cemented walls, but to obviate the drawbacks from which they suffer. This is attained, according to this invention, by rendering the manure bed portable, in that it is constituted by large-sized boxes in which the manure is stored. When the thus stored manure is to be conveyed to the field, each box is placed upon a car with which it is connected in order to be transported without any reloading, as was formerly requisite. The capacity of the boxes corresponds in general with the capacity of several railway wagons, as a device designed according to this invention is intended for use only where the amounts of manure to be transported are very large. The cars required for transporting the filled manure boxes to the field are used for this purpose only during just that time, whereas at the intermediate periods of time they can be used in any other way whereby the economy of the plant is increased.

In a particularly practical constructional form of the plant the boxes are located upon walls during those times in which they are filled and the manure is kept stored in them, the height of the walls being such that a car, preferably with endless runners, can be run below the boxes supported upon said walls. The cars are provided with lifting devices by means of which the filled boxes can be raised from the walls, whereafter the cars convey the boxes to those places of the fields, where the manure is required.

The invention is illustrated diagrammatically and by way of example on the accompanying drawings, on which Figure 1 is a side-view of a manure bed designed according to this invention. Figure 2 is a plan of the same, and Figure 3 an end-view thereof. Figure 4 is a side-view of a car with endless runners, Figure 5 is an end-view of the same, and Figure 6 a plan thereof. Figure 7 is a view similar to Fig. 4 and shows a modification of the car, and Figure 8 is a view similar to Fig. 5 and relates to this modification. Figure 9 is a plan of a combined manure box and soil plough, all as fully described hereinafter.

1 (Figs. 1-3) denotes boxes in which the stable manure is stored. The capacity of every box is equal to that of several railway wagons, for instance from 20 to 30 tons. The boxes are generally supported on masonry constituted by individual masonry walls arranged parallel to one another and leaving between them spaces of such a width that a car for example such as shown in Figs. 4-8, can be run thereinto, below said boxes, as shown in Fig. 3. The rows of boxes form pairs, and between these pairs are horizontal scaffolds 3 provided at their ends with ramps $3^a$. These ramps and scaffolds serve for conveying the manure from the stables to the boxes which is done preferably with the aid of tipping carts 4 (Fig. 3). In order to facilitate introducing the manure into the boxes 1, the side walls of these latter may be partly or wholly designed as flaps.

When the boxes have been placed upon the walls, there remain below them hollow spaces, and when the manure collected in the boxes is to be conveyed to the field, suitably designed cars are run into said spaces below the respective filled boxes. The cars are also so designed that the boxes located above them can be slightly lifted off from the walls 2 supporting them, and this having been done and the boxes having been securely connected with the cars are now conveyed to the field.

A conveying car especially suited for the purpose in view is shown in Figs. 4-6. It consists of a platform 5 below which is a supporting frame provided with endless runners of any approved construction, and on the platform are lifting devices 6 also of any suitable and approved construction, for instance similar to the known car lifters. The means for driving the car have not been shown and need not be described, because they do not form a part of the present invention.

Another constructional form is shown in Figs. 7 and 8, this form being intended for such cases in which the boxes 1 are not supported upon walls, but are merely placed upon the flat ground. The frame of such a car is designed as a sort of portal, or portal crane respectively, there being provided on or at it lifting devices for raising the respective box from the ground. The lifting devices may be driven, for instance, by means of an electromotor 7. These cars may either be used for conveying the lifted boxes to the field, or when the box has been lifted a conveying car of the first described construction (Figs. 4–6) may be used for the conveying purpose, it being understood that the boxes, prior thereto, have been disconnected from the lifting device of the portal car.

In Fig. 9 is shown an example, according to which the conveying car is combined or coupled with a plough 8 by means of which the manure strewed from the box 1 upon the field is instantaneously ploughed deeply into the soil. Instead of coupling the plough with the car, it may, of course, be coupled with the manure box. By ploughing the manure at once into the soil the manure is prevented from being exposed upon the field for some length of time to the influence of the air, the sun, and the wind whereby the quality of the manure and its effect might be impaired, whereas now both are fully preserved.

The distribution of the manure from the boxes 1 may be effected automatically by means of any of the devices known for that purpose. I have abstained from showing such an arrangement and combination of parts, as it does not form a part of this invention. But it will be obvious that it is then possible to distribute the manure over the field and to plough it at the same time into the soil merely by running the conveying car with the manure box thereon and the plough attached thereto over the field.

The invention is suited especially for agricultural establishments of middle and large size where the amounts of stable manure are pretty or very large. It constitutes a considerable progress over the known stationary manure beds as hitherto employed, in that not only the chemical values of the manure are excellently preserved, but also the tedious labors otherwise necessitated by the reloading of the manure from the stationary beds onto cars in order to convey the manure to the field are done away with. Finally, any impairing of the quality of the manure as caused by the reloading is obviated.

I claim:

In combination, a plurality of pairs of supports, the supports of each pair being parallel and spaced apart, the innermost support of each pair defining a passage between them narrower than that between the supports of a pair, and an elevated track carrying platform extending longitudinally of such relatively narrow space, the elevation of the platform being materially above the tops of the adjacent supports.

ELEMÉR von RÉCSEY.
NICOLAUS von RÉCSEY.